United States Patent [19]
Bennett et al.

[11] Patent Number: 5,189,733

[45] Date of Patent: Feb. 23, 1993

[54] APPLICATION PROGRAM MEMORY MANAGEMENT SYSTEM

[75] Inventors: John G. Bennett, San Mateo; Anders Hejlsberg; Peter Kukol, both of Aptos, all of Calif.

[73] Assignee: Borland International, Inc., Scotts Valley, Calif.

[21] Appl. No.: 397,075

[22] Filed: Aug. 22, 1989

[51] Int. Cl.⁵ .......................... G06F 9/40; G06F 9/46
[52] U.S. Cl. ................................... 395/650; 395/425; 395/700; 395/725; 364/DIG. 1; 364/256.3; 364/281.7; 364/281.8; 364/286
[58] Field of Search ............... 364/DIG. 1, DIG. 2, 364/200 MS FILE, 900 MS FILE; 395/425, 725, 650, 700, 400

[56] References Cited

U.S. PATENT DOCUMENTS

| | | | |
|---|---|---|---|
| 4,080,651 | 3/1978 | Cronshaw et al. | 395/425 |
| 4,257,096 | 3/1981 | McCullough et al. | 395/650 |
| 4,445,173 | 4/1984 | Pilat et al. | 395/400 |
| 4,450,522 | 5/1984 | Pilat et al. | 395/400 |
| 4,454,580 | 6/1984 | Page et al. | 395/375 |
| 4,511,964 | 4/1985 | Georg et al. | 395/400 |
| 4,649,480 | 3/1987 | Ohki et al. | 395/375 |
| 4,945,480 | 7/1990 | Clark et al. | 395/700 |
| 4,984,150 | 1/1991 | Mori | 395/575 |
| 4,989,137 | 1/1991 | Oxley et al. | 395/400 |
| 5,023,773 | 6/1991 | Baum et al. | 395/400 |
| 5,032,981 | 7/1991 | Bril et al. | 395/400 |
| 5,043,869 | 8/1991 | Suzuki et al. | 395/425 |

OTHER PUBLICATIONS

Peterson et al., Operating System Concepts, 1983, pp. 189-193.
Kaisler, S. H., The Design of Operating Systems for Small Computer Systems, 1983, 266-291.
Tanenbaum, A., Operating Systems Design and Implemention, 1987 pp. 209-222.

*Primary Examiner*—David L. Clark
*Assistant Examiner*—John C. Loomis
*Attorney, Agent, or Firm*—John A. Smart

[57] ABSTRACT

A computer system for executing application programs with limited available main memory capacity includes a main memory management system. The architecture of the stub vectors of a swappable code object and the protocol for referencing the stubs in active call frames reduces the overhead time of code object swapping. The stub vectors for a swappable code object are clustered together in memory; and each cluster comprises at least one entry stub and a return stub. A return stub vector is referenced in an active call frame only when its associated code object is not resident in main memory or when the code object has been placed on probation in contemplation of moving the object out of main memory. A linked list of resident code objects is employed in the selection of objects to be removed from main memory. A number of the least recently used code objects are put on probation in anticipation of the need to swap code between main memory and bulk memory. A call for or a return to an object on probation serves to remove the object from probation.

27 Claims, 7 Drawing Sheets

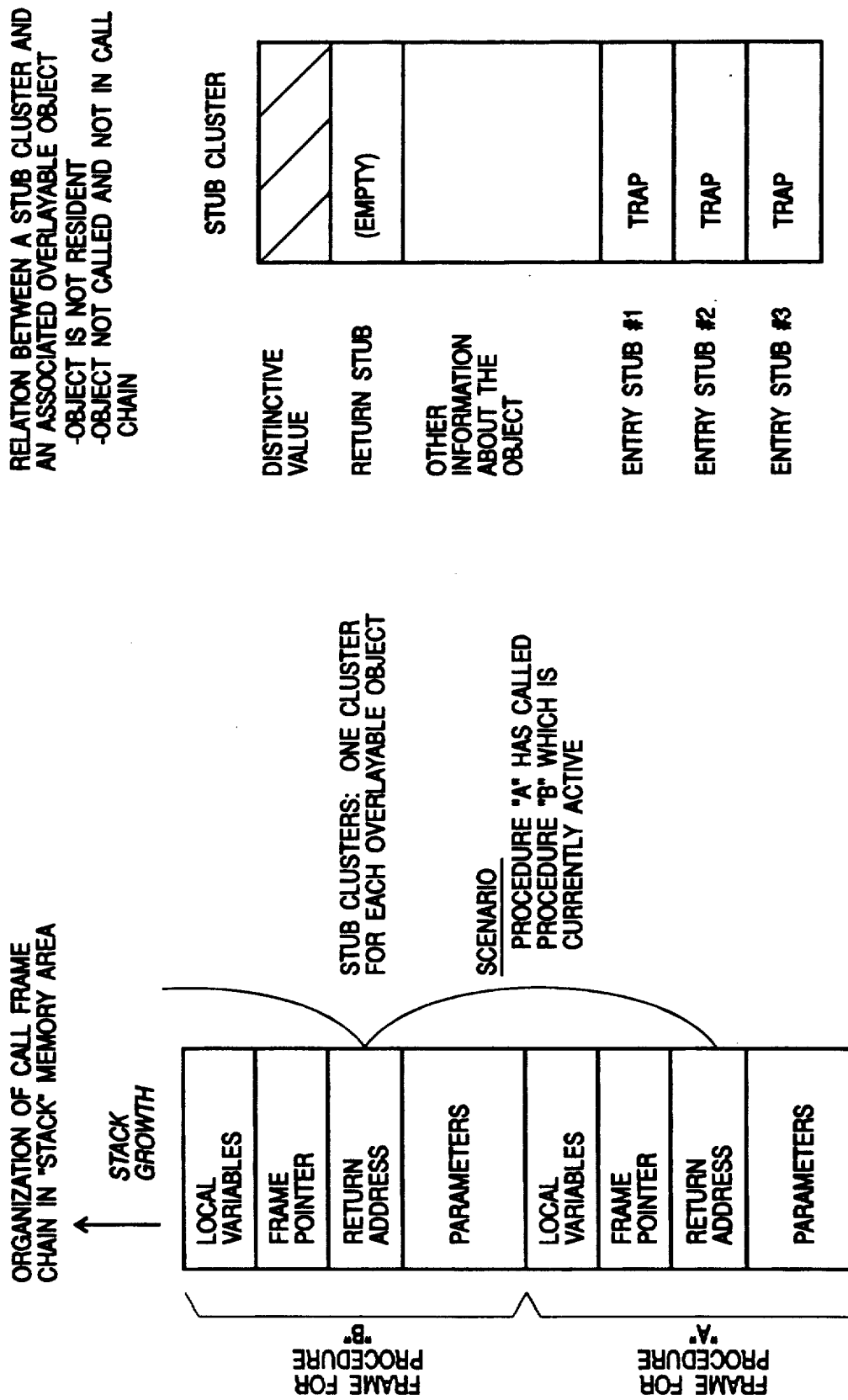

APPLICATION PROGRAM MEMORY MANAGEMENT SYSTEM

TECHNICAL FIELD

This invention relates to the management of memory resources in a computer.

BACKGROUND OF THE INVENTION

Computer systems comprise a main memory, one or more bulk memories e.g., disk memories, a processor, and input-output devices.

In the case of personal computers, there is a very large installed base of computers in which the main memory has a limited maximum capacity e.g., 640 kilobytes or 1 megabyte of random access memory. Computers with these limited ranges of main memory capacity have a continuing substantial share of the current market in personal computers. In the case of larger multi-tasking computers, there is continuing competition among application programs for main memory capacity.

Software for a computer comprises an "operating system" and application programs e.g., word processing programs, spread sheet programs, etc. The operating system software manages the system hardware and executes code presented by an application program. It is the responsibility of the application software to manage the allocation of its available main memory space during an execution session.

Although many application programs perform quite well in computers with limited available main memory, there is a demand in the market place for application programs which operate faster and process larger volumes of data within the hardware constraints. These are competing requirements. When the volume of code of an application and/or the volume of data actively processed by the code approaches or reaches the available main memory capacity, code execution is slowed; and in some cases, if the demand for main memory exceeds the available capacity, processing may be halted or data lost.

As a solution to limited main memory capacity, some application programs provide software mechanisms for "swapping" overlay code and data objects between main memory and bulk memory. Objects, code or data, are sections of code or data which are contiguous and ordered within the memory space assigned to the object; however, objects may have arbitrary memory locations relative to each other. Objects which are in main memory are termed "resident", and objects which are in bulk memory and not in main memory are termed "suspended" or non-resident. Only objects which are resident can be executed or directly accessed. If a program in progress needs to execute a suspended code object or access a suspended data object, the suspended object must first be loaded into main memory. In the event that there in not enough available main memory space to accommodate the needed object, one or more resident objects must be suspended.

Programs which provide object swapping between main memory and bulk memory employ a pointer in memory as a surrogate for each object. The pointer defines the physical address of its object. If the object is a code object, as opposed to a data object, the surrogate may include a short sequence of code which is generally known as a "stub vector". Entry to the code object is effected by execution of the stub vector code which assures that the object is resident or becomes resident. Code objects consist of code which is logically associated for ease of program execution. There may be several entry points to a single code object and each entry point has an associated entry stub vector.

Of necessity, all swapping systems slow program execution because of the delays incurred in suspending objects and restoring objects to resident status. The effectiveness of a swapping system is directly dependent on the quality of the decisions as to selection of objects to be suspended. Arbitrary selection of objects to be suspended tends to cause inconsistent and annoying delays in program execution. Some prior art swapping systems employ a "least recently used" (LRU) algorithm to select objects to be suspended. There are a number of different strategies for implementing an LRU process which operate with different degrees of success.

The selection of an object as a candidate to be suspended is not without risk. Care must be taken to insure that an object which is currently executing or an object which is directly or indirectly responsible for the currently executing object is not suspended without knowledge of how to resume execution of the suspended object.

While there are a number of prior art solutions to this problem, each solution has its own undesirable features. The following are a few of the known prior art solutions:

Wait until the program itself explicitly permits the code object to be suspended. Until that time, the code object must remain resident. This puts a heavy burden on the program designer.

Identify the current active object and trace all its antecedent objects which have not completed execution (usually because they have called upon each other in turn to do some part of the execution), and do not allow that set of objects to become suspended. While this is automatic and foolproof, some antecedent objects must remain resident, even though it may be a long time before their execution is resumed. Accordingly, there must be enough main memory to hold the largest possible chain of antecedents, which is generally much larger than an optimal size.

Require an object to return to its stub vector which has saved special information to enable safe return to its caller even if the caller needs to be made resident before return thereto. This allows a program to execute correctly; however, it has the drawback that both the entry and the return procedures are slowed by the need to log the calling information at the time of the call, and to unravel the information at the time of return. This solution is undesirably slow and the stub vectors are large.

DISCLOSURE OF THE INVENTION

In accordance with the present invention, a computer system for executing application programs in a limited memory space comprises a computer having a memory and a processor; a plurality of code objects, both resident and overlayable; one or more data objects; at least one entry stub vector for each overlayable code object; a return stub vector for each overlayable code object; an active call list with references to code objects to which return is to be made; and a software memory manager which selects and suspends objects and maintains records of references for return to objects in the active call list.

A return stub vector is referenced in the active call list only when its associated object has been moved out of main memory. If return from a call is to an object which is resident in main memory, a normal direct return to the appropriate place in the object is executed without use of the object's return stub.

In accordance with an aspect of this invention, the stub vectors of each code object, entry stubs and the return stub, are clustered together and they are assigned a fixed, distinctive base address which cannot be confused with the base address of any other stub or of any code or data object.

In accordance with another aspect of this invention, the contents of the base address of each stub cluster is a distinctive code pattern; and other contents of each cluster define the current status and current address of the associated code object. Since a debugger program can distinguish between code objects and stub vector clusters that represent code objects on the basis of the distinctive pattern, the debugger program's tables of addresses of swappable code objects can use the base addresses of the stub clusters as equivalent to the base addresses of the objects.

In accordance with another aspect of this invention, records of the resident code objects are maintained in order in a linked or positional list. The objects which are likely candidates to be suspended are at one end of the list (the suspend end); and the objects most recently used or otherwise known to be unlikely to be suspended are kept at the other end of the list (the keep end). Each entry in the list includes a flag which, when set, indicates that the associated object is on "probation" from suspension. A small number of the objects nearest the suspend end of the list e.g., 25 percent of the objects, are put on probation.

When an object is placed in the probation state, the associated stub vectors are set to trap all calls or returns to the object; and the return addresses of frames of the call chain which are to return to the object on probation are set to the address of the object's return stub.

If a call or return is made to an object on probation, the traps are removed from the stub vectors; references to the object's return stub are removed from the active call list; the position of the object in the linked list of resident objects is moved to the keep end of the list; and the object is removed from probation.

In accordance with another aspect of this invention, call frames which must be modified when a suspended object is made resident are discretely marked to shorten the search time to find a frame to be modified.

THE DRAWING

FIG. 2 illustrate the organization of a call frame chain in stack memory;

FIGS. 3, 4, 5, 6 illustrate the relation between a stub cluster and an associated overlayable code object for different states of the object;

DETAILED DESCRIPTION

Figure 1A:
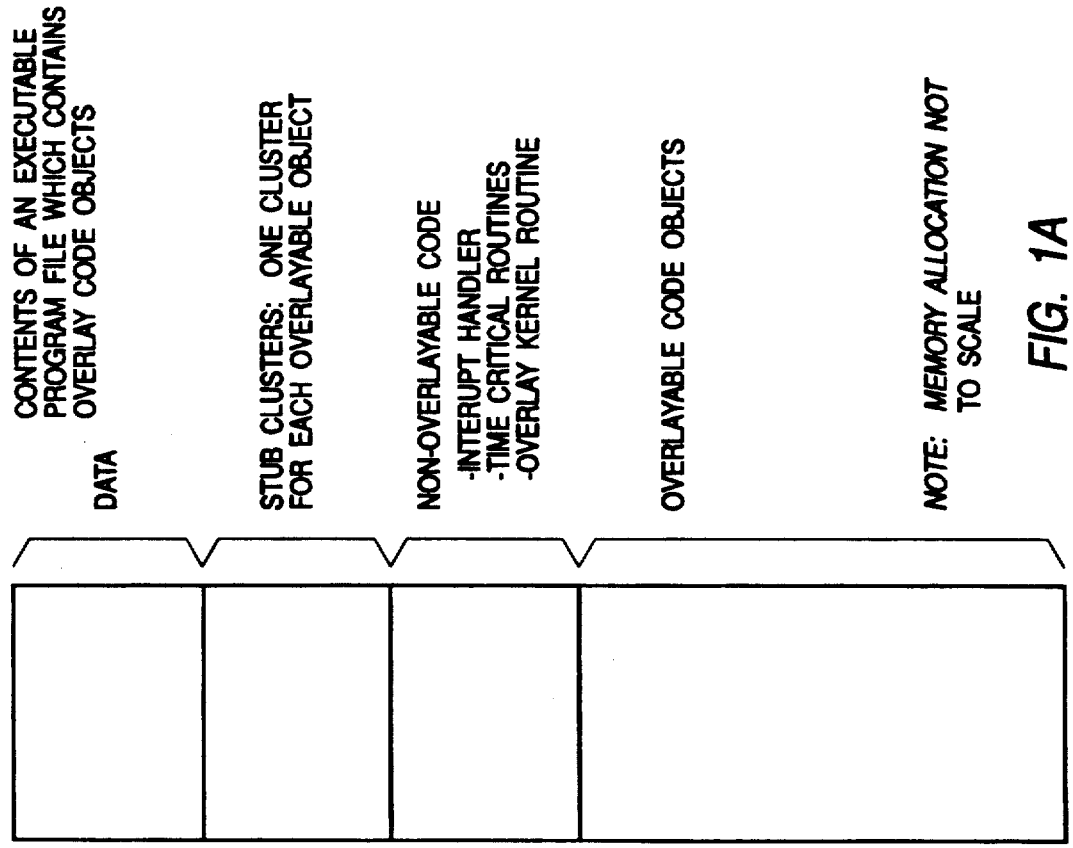
FIG. 1A illustrates the contents of an executable program file with overlay code objects.

FIG. 1A, which is not drawn to scale, illustrates the major components of an application program intended for use in a computer system with limited available main memory capacity.

Figure 1B:
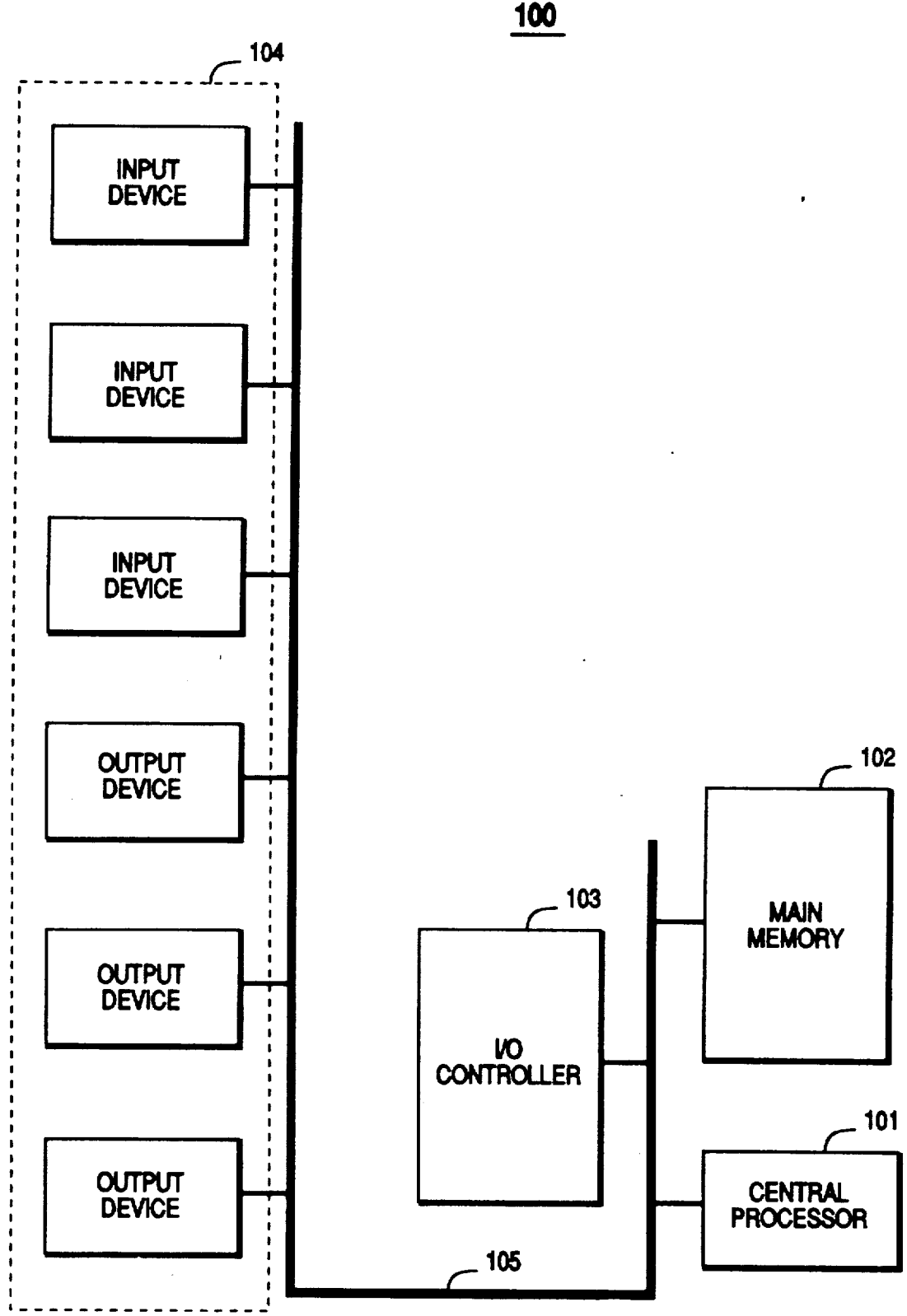
FIG. 1B is a block diagram of a computer system in which the present invention may be embodied.

As shown in FIG. 1B, the present invention may be embodied in a computer system 100 comprising a central processor 101, a main memory 102, an input/output controller 103, and a plurality of input/output devices 104. As illustrated, the various components of the system 100 communicate through a system bus 105 or similar architecture. In a preferred embodiment, the system 100 is an IBM-compatible personal computer, available from several vendors (including IBM of Armonk, N.Y.).

Sections of program code which must be in main memory at all times during execution of the application are designated as non-overlayable code. Examples of such code are: interrupt handler routines, time critical routines, the overlay kernel routine, and the stub clusters.

Sections of program code which can be swapped between main memory and bulk memory are designated as overlayable code objects. Code objects may be of any convenient size and may contain one or more procedures as dictated by program design logic. A procedure may appear in more than one code object. Code within an object is contiguous and ordered within the object; and objects may have arbitrary locations relative to each other.

As shown in FIG. 1, a portion of the program file is designated as stub clusters. There is one stub cluster for each overlayable object. A stub cluster comprises at least one entry stub vector and a return stub vector. In accordance with this invention, the base address of each stub cluster is a fixed distinctive address which cannot be confused with the base address of any other stub or with the address of any object, code or data. The construction of stub vector clusters is explained later herein with respect to FIGS. 3 through 6.

The remainder of the program file is designated as data. Data comprises information about the program environment e.g., default values and parameters, information processed by the program and the results of processing.

FIG. 2 is an illustrative example of two frames of an active call frame chain which is stored in "stack memory". In FIGS. 1 through 9, low numbered memory address locations appear at the top of the figure and addresses increase from top to bottom.

Each call frame comprises at least a return address area and a frame pointer area. A call frame may further contain parameters and local variables.

The style and thus the content of a call frame may be dictated by the particular processor in which the program is to be run. For example, in the case of the Intel iAPX-86 processor architecture the standard style is known as the "far call" frame. In this style the frame has a 32-bit pointer to the calling object, followed immediately by a copy of the contents of a local frame pointer register. In the iAPX-86 processor, the Base Pointer (BP) register is, by custom, the local frame pointer register.

In some programming cases, it is more convenient to use a "near call" frame with a 16-bit pointer to the calling object rather than the 32-bit far pointer. Since, in accordance with this invention, there is a need to search through the chain for references to an object which is being placed on probation or being suspended, and for references to an object which is being taken out of probation or being made resident, frames with 16-bit pointers must be distinguishable from those with 32-bit pointers. In accordance with standard practice, the content of the Base Pointer register is always an even number. In accordance with this invention, the least significant bit of the saved local frame pointer word is selectively changed to distinguish "far call" and "near call" frames from one another. For example, when the content of the BP register is copied into a "near call" frame with a 16-bit pointer, the copied value is changed from even to odd. The convention may be reversed by changing the value copied into the "far call" frames from even to odd.

FIGS. 3 through 6 illustrate the relation between a stub cluster and the associated code object for different states of the object.

The stub cluster of FIG. 3 illustrates the makeup of a cluster and the contents for a non-resident code object which is not in the active call frame chain.

The cluster comprises: a distinctive code pattern at the cluster base address; a single return stub; relevant information about the code object e.g., the current status and current address of the associated code object; and at least one entry stub.

The inclusion of a distinctive code pattern at the base address of each stub cluster eases the design and operation of a debugger program procedure. Since a debugger program can distinguish between code objects and stub vector clusters that represent code objects on the basis of the distinctive pattern, the debugger program's tables of addresses of swappable code objects use the base addresses of the stub clusters as equivalent to the base addresses of the objects.

Since the object associated with the cluster of FIG. 3 is not in the active call frame chain, the return stub is empty; and because the object is not resident, the entry stubs are set to trap any calls for the object. The trap sequence calls the overlay mechanism which serves to make the object resident and to update the object's stub cluster as illustrated in FIG. 4.

Figure 4:
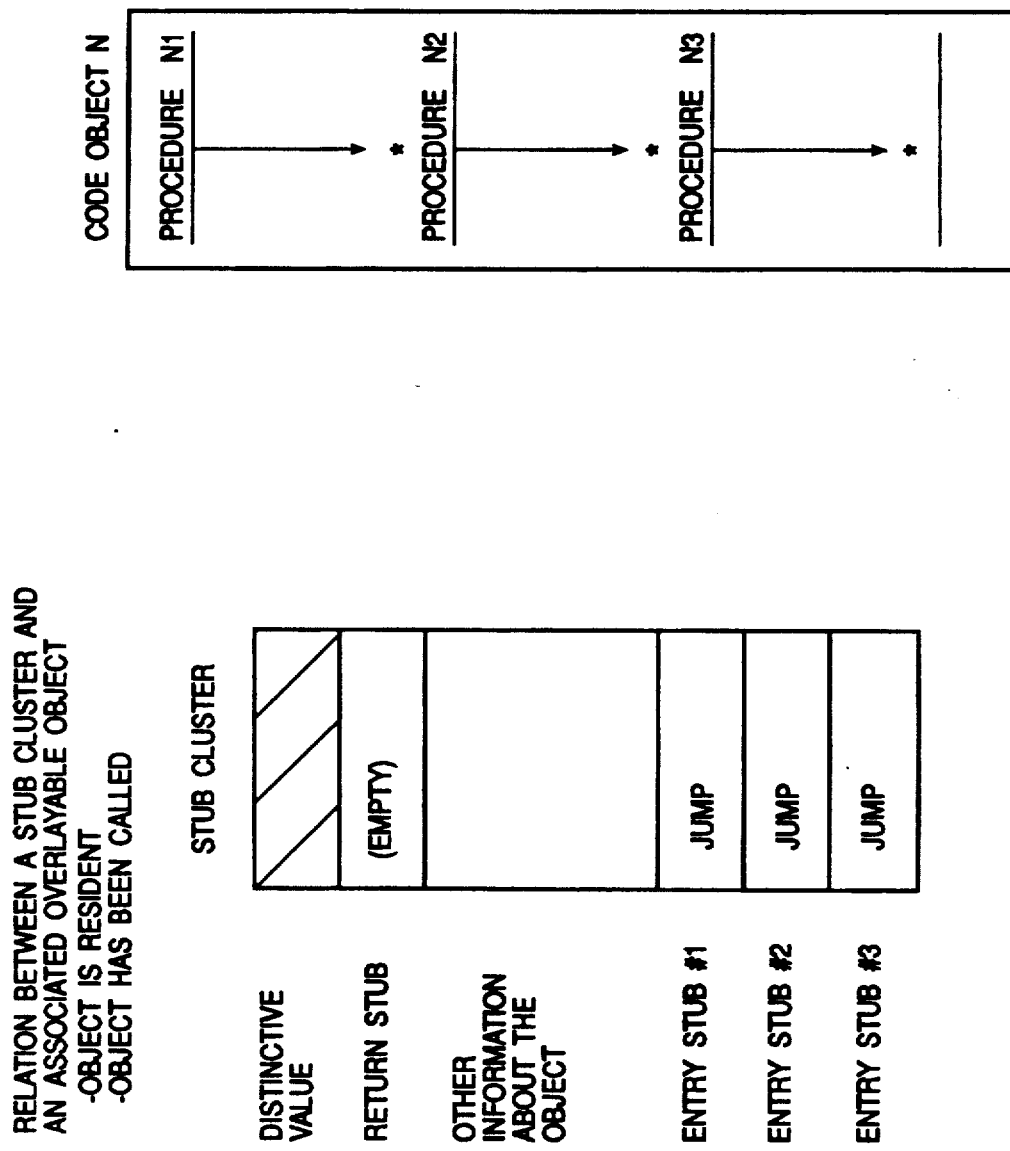

In FIG. 4, the object is resident and has been called. Since the object is resident and not on probation, the return stub is empty; and the entry stubs are referenced to their respective entry points in the object.

Figures 5, 6:
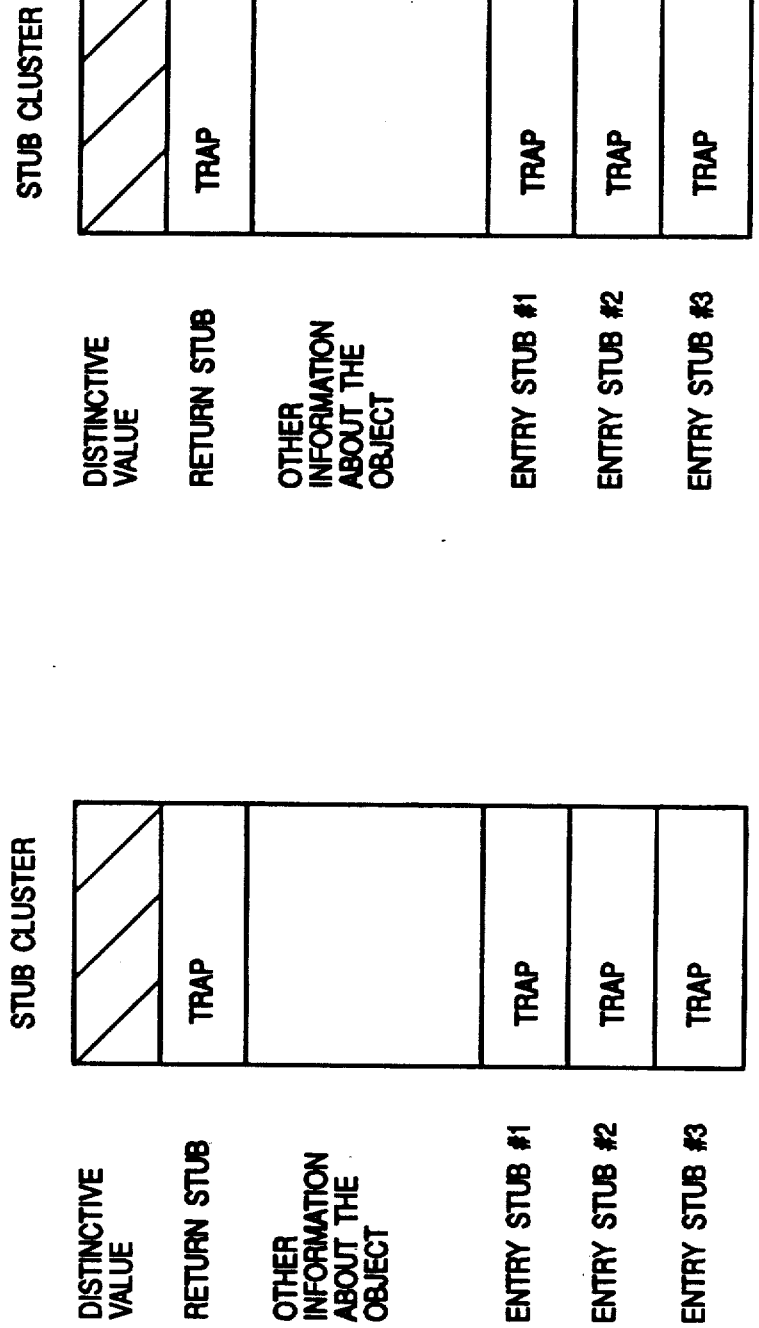

In FIG. 5, the object is resident and is on probation. If the object associated with the cluster of FIG. 3 is referenced in the call frame chain and on probation, the return stub is set to trap any returns to the object and the entry stubs are set to trap any calls to the object. If the object is not referenced in the call frame chain, the return stub is empty and the entry traps are set to intercept calls to the object. The trap procedure referenced in FIG. 5 may be the same procedure referenced in FIG. 3 or it may be a different procedure specifically structured to handle objects on probation. If the traps of FIG. 3 and FIG. 5 employ a common routine, the trap procedure examines the cluster to distinguish between objects on probation and non-resident objects and proceeds accordingly.

In FIG. 6, the object is not resident; the object is in the active call frame chain and has called onward to another object. Because the object is not resident and has called onward, the return stub is set to trap returns to the object. Because the object is not resident, the entry stubs are set to trap any calls to the object.

Figure 7:
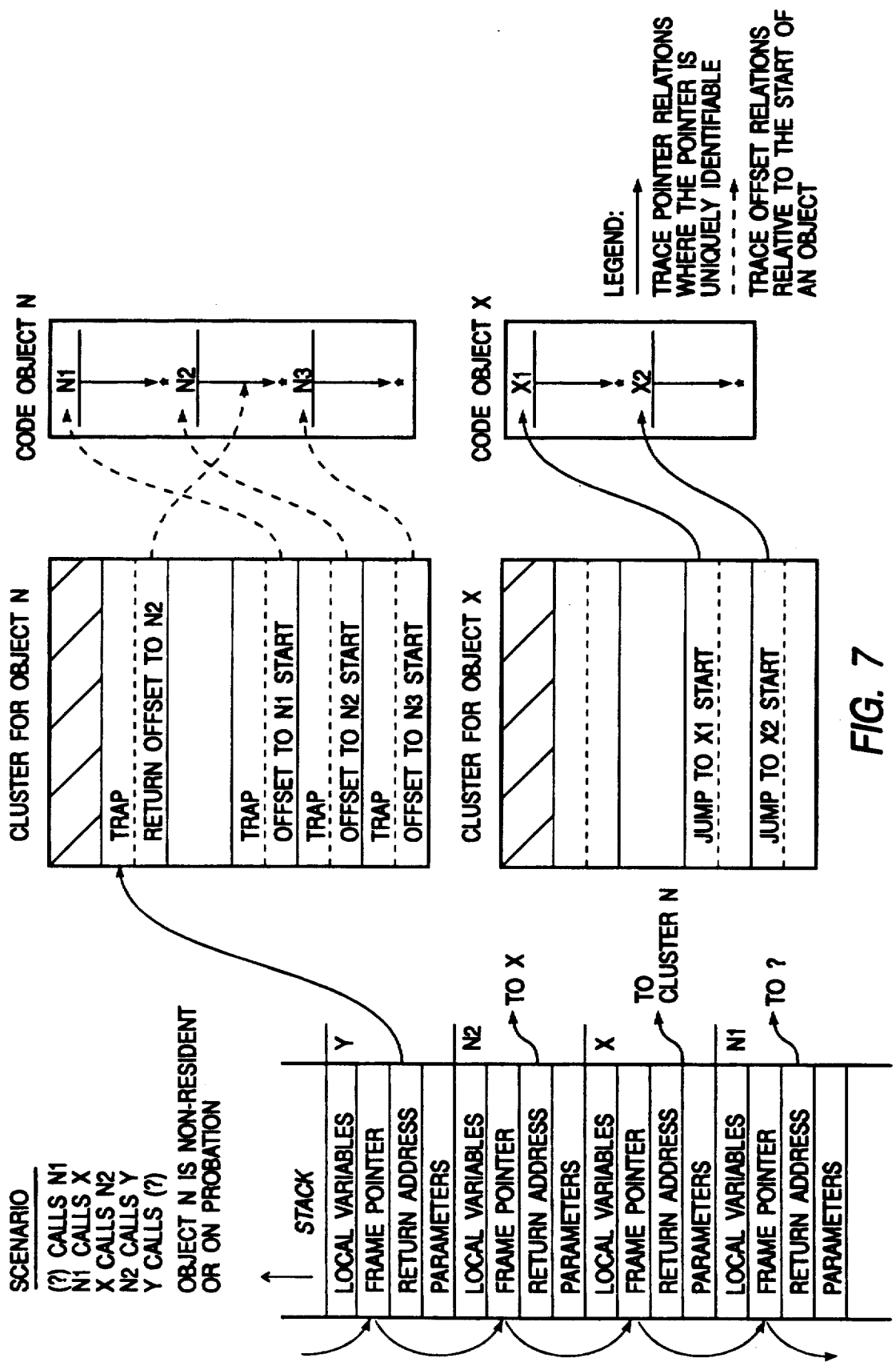
FIG. 7 illustrates a sequence of calls in a call frame chain.

FIG. 7 shows four frames i.e, Y, N2, X, and N1 of the active call frame chain; Stub clusters for code objects N and X; and code objects N and X. The states of the frames in the call chain and the states of the clusters for objects N and X are taken at the time that return is attempted from object Y to object N2.

The contents of the stub vectors of object N (see FIGS. 5 and 6) indicate that object N is referenced in the active call chain and is non-resident or on probation at the time return thereto is initiated. The trap procedure, on the basis of other information stored in the cluster, either proceeds to make object N resident and provides return to the appropriate location within procedure N2; or proceeds to take object N off probation and provide return to the appropriate location within procedure N2. The offset for return to the proper point in procedure N2 is stored in the return stub vector of object N. As seen in FIG. 7, the return address of frame Y uniquely defines the return stub of object N.

If object N is merely on probation, the trap procedure calls the probation mechanism to remove the object from probation. The probation mechanism proceeds to: remove the traps from the return stub and from the entry stubs of the cluster for object N; scan through the call frames and replaces all references to the return stub with the current address of the object; and then returns processing to the code at the return address in procedure N2. In the illustrative call sequence shown in FIG. 7, the reference to the I.D. of cluster N in the return address in Frame X is replaced with the actual address of object N. Accordingly, when frame X completes execution there is a direct return to the proper return point in procedure N2.

If the object N is found to be non-resident, the trap procedure calls the code overlay mechanism. The overlay mechanism determines which code object or objects must be swapped out to make room in main memory for object N; sets traps in the return stub and the entry stubs in the cluster of any object being made non-resident; and scans the active call frame chain for frames that return to object N. The offset value in the return address in the most recent frame in the chain is copied into the return offset register in the return stub. At the same time the address of the return stub for object N is set in the return address of the call frame. Thereafter, object N is moved into main memory; the base address thereof is stored in the "other information" portion of the stub cluster of object N; and returns processing to the code at the return address in procedure N2.

As seen from the above discussion, removing an object from probation is less complicated and time consuming than swapping objects between main and bulk memory.

Figure 8:
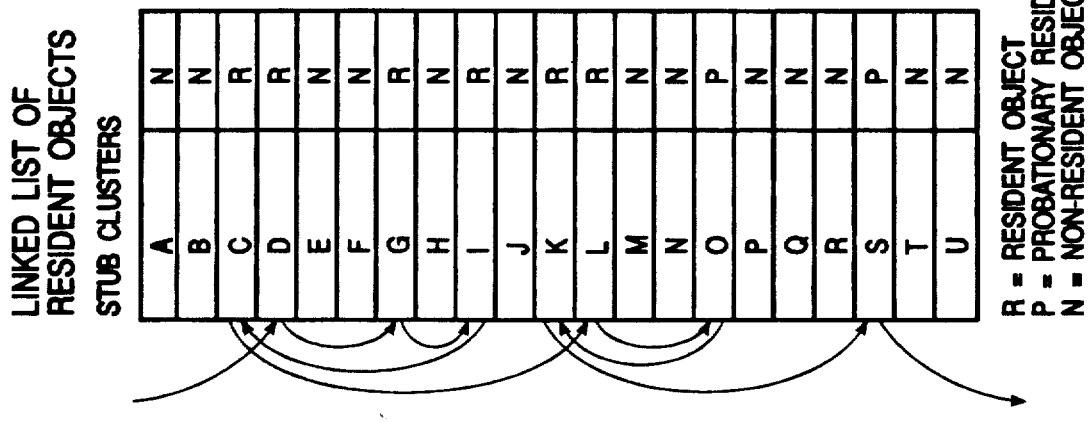
FIG. 8 illustrates a linked list of stub clusters.

FIG. 8 is an illustrative example of an ordered list of resident objects ordered from the most recently used end of the chain to the least recently used end.

The list of objects in FIG. 8 includes non-resident objects; however, only resident objects are linked. Each record in FIG. 8 includes a status register for indicating the current status of the object i.e., resident (R), non-resident (N), or on probation (P).

In the example, the object D is at the most recently used end of the list and the objects O, K, and S are at the least recently used end of the list. As objects are called, they are added to the most recently used end of the list. The objects marked P are on probation and are the most likely candidates for suspension. If an object that is on probation is called or if a return is made to an object on probation, the object is removed from probation and is placed at the most recently used end of the linked list.

Figure 9:
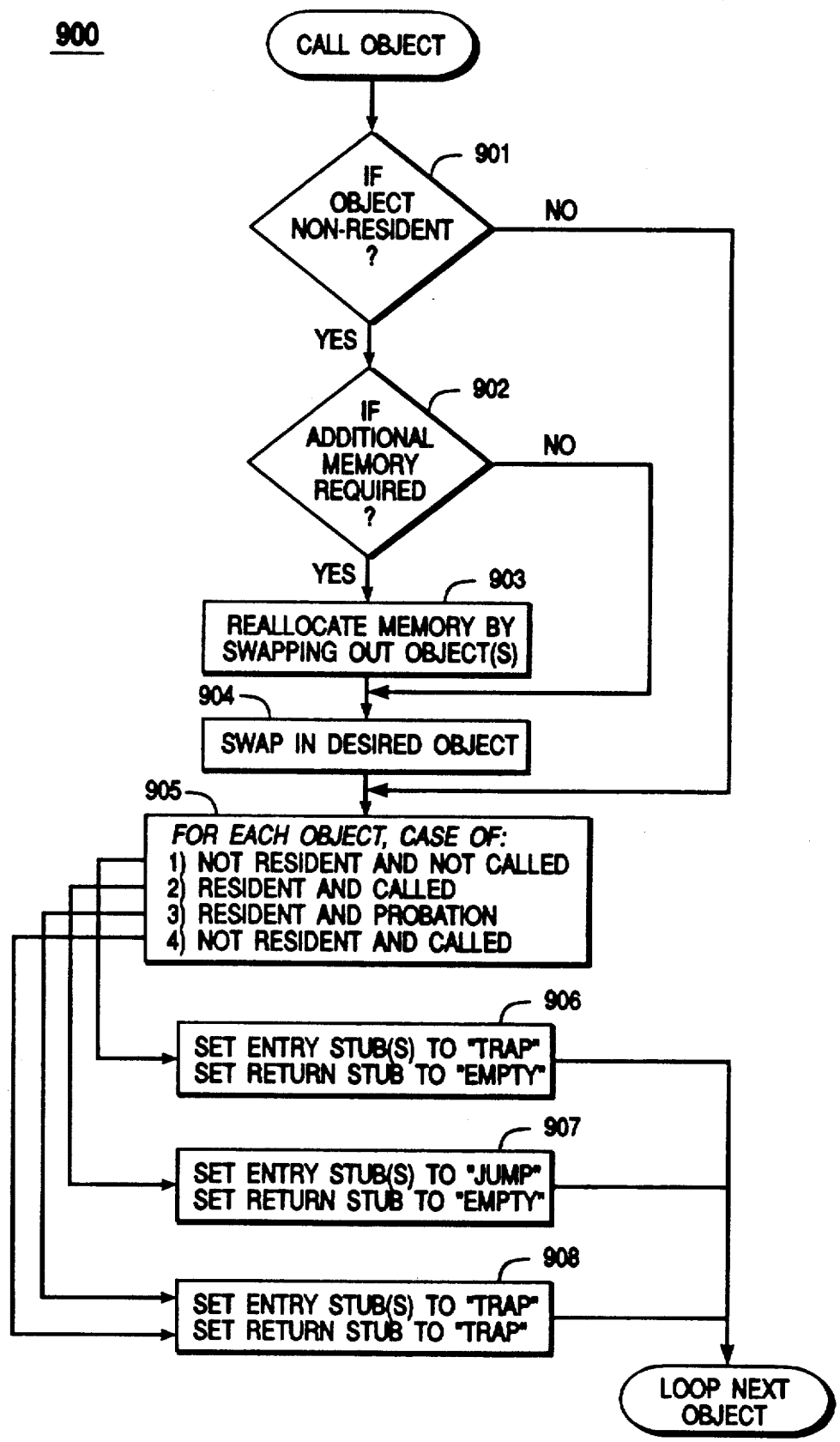
FIG. 9 is a flowchart illustrating the overall operation of the memory management system of the present invention.

As shown in FIG. 9, the overall operation of the memory management system of the present invention may be summarized by a flowchart 900. The steps of this method are as follows. When an object is called (e.g., by another code object or procedure), in step 901 the routine 900 determines if the object is non-resident, i.e., not present in the main memory 102. If an object is non-resident (yes at step 901), then the object will be swapped into memory as follows. In step 902, the main memory 102 is checked to determine if sufficient memory space is available for the desired object. If additional memory space is required (yes at step 902), then available memory is increased by swapping out one or more objects (using any desired method to determine objects which may be swapped, such as the least recently used algorithm). After sufficient memory has been freed in step 903, in step 904 the desired object is swapped in. In a typical embodiment, such as the system 100, the object would be copied from an I/O device (e.g., hard disk) to the main memory 102. However, if the object which is called is already resident (yes at step 901), then steps 902-904 are skipped.

Next, the routine 900 will set the entry stub(s) and return stub for each object as follows. In step 905, if an object is not resident in the memory 102 and not called (i.e., referenced in the current call chain), then in step 906 the entry stubs are set to "trap" and the return stub is set to "empty". In step 905, if an object is resident and called, then in step 907 the entry stubs are set to "jump" and the return stub is set to "empty". In step 905, if an object is resident but on probation, or if an object is not resident and has been called, then in step 908 both the entry stub(s) and the return stub are set to "trap". Steps 905-908 are repeated for additional objects, after which the routine 900 is posed to accept the next call to a desired object.

In summary, the selective use of a single return stub vector for each object to handle only returns to objects on probation and non-resident objects permits a very large percentage of call returns to be executed directly without indirection or delay. The grouping of the return stubs and the entry stubs of an object in a cluster speeds swapping of objects between main and bulk memories and greatly simplifies the design of a matching debugger program; and the use of the probation state of resident code objects improves the quality of decisions as to which code is to be moved out of main memory.

The invention has been described with particular attention to its preferred embodiment; however, it should be understood that variations and modifications within the spirit and scope of the invention may occur to those skilled in the art to which the invention pertains.

What is claimed is:

1. In a computer system having a main memory and a secondary memory for storing objects not present in the main memory, a method for execution of an application program in a limited memory space, said program including at least one code object capable of removal from the main memory during program execution, the method comprising:

(a) allocating space in main memory for an entry stub for accessing a code object which is required to be resident in the main memory;

(b) if a code object is resident at a location in the main memory, storing as the entry stub a vector to the code object at the location;

(c) if a code object is not resident at a location in the main memory, storing as the entry stub an instruction executable by the computer upon any calls to the code object; and (d) processing each call to a code object by at least referencing the entry stub, whereby a call to the code object results in execution of the instruction by the computer when the code object is not resident.

2. The method of claim 1, further comprising:
allocating space at a plurality of contiguous locations in main memory for a plurality of entry stubs, each for referencing at least one entry point of a code object which has been called.

3. The method of claim 1, wherein said vector includes a jump instruction and an address in memory for the object.

4. The method of claim 1, wherein said instruction initiates execution of a system interrupt for invoking a procedure to retrieve the code object from the secondary memory and store the code object in the main memory.

5. The method of claim 1, further comprising:
calling a code object;
if a called code object has an entry stub storing said instruction,
(i) loading the code object from the secondary memory into a location in the main memory, and
(ii) repeating step (b).

6. The method of claim 1, further comprising:
if a called code object has an entry stub which is not set to trap the call, accessing the code object at the location pointed to by the vector stored in the entry stub.

7. The method of claim 1, further comprising:
(e) allocating space in memory for a return stub for returning to a code object which has called another object;
(f) if a code object is not resident in the main memory, storing in the return stub an instruction executable by the computer upon any returns to the code object; and
(g) processing an attempt to return to a code object by at least referencing its return stub, whereby an attempt to return to the code object results in the instruction being executed by the computer when the code object is not resident in the main memory.

8. The method of claim 7, further comprising:
(i) calling from one code object to another code object and repeating steps (b)-(d), whereby the callee code object becomes resident in the main memory by retrieving it from the secondary memory and a stack frame having a return pointer for returning to the caller code object is added to a call stack in the main memory;
(j) repeating step (i) for a plurality of code objects, whereby a plurality of stack frames are added to the call stack;
(k) storing in the main memory by retrieving from the secondary memory a called code object which is not resident in the main memory and for which there is insufficient memory space, by marking memory space for selected ones of the called code objects in the main memory as available for storing the called, non-resident code object, whereby any code object stored previously in the marked memory space becomes a non-resident code object; and (l) scanning the call stack and updating return pointers which point to any non-resident code objects.

9. The method of claim 7, wherein the instruction of step (f) includes a trap instruction.

10. The method of claim 1, wherein the instruction of step (c) includes a trap instruction.

11. In a computer system having a main memory and a secondary memory for storing objects not present in the main memory, a method for execution of an application program in a limited memory space, said program including at least one code object capable of removal from the main memory during program execution, the method comprising:

(a) allocating at least one reserved location in the main memory for referencing a code object, said at least one reserved location storing first information for calling the code object and second information for returning to the code object from another code object which it has called;

(b) storing as the first information a vector to reference at least one entry point of a code object at a location if the code object is resident in the main memory;

(c) storing as the first information an instruction which is executed by said computer when a call is made to a code object stored in the secondary memory if the code object is not resident at a location in the main memory;

(d) storing as the second information a vector to reference a return point of a code object at a location if the code object is resident in the main memory;

(e) storing as the second information an instruction which is executed by said computer when a return is made to a code object stored in the secondary memory if the code object is not resident at a location in the main memory;

(f) instructing the processor to call a code object by referencing the first information; and (g) instructing the processor to return to a code object by referencing the second information.

12. The method of claim 11, wherein said instruction of step (c), when executed by said computer, traps any calls to a code object if the code object is stored in the secondary memory and not in the main memory.

13. The method of claim 11, wherein said instruction of step (e), when executed by said computer, traps any returns to a code object if the code object is stored in the secondary memory and not in the main memory.

14. The method of claim 11, further comprising:

(i) upon execution of the instruction of step (c) or upon execution of the instruction of step (e), removing other code objects from the main memory and loading a desired code object into the main memory from the secondary memory.

15. The method of claim 11, further comprising: for each code object which has been called and has itself called on to another object, storing a return pointer in a call stack of the main memory for returning to said each code object; and scanning the call stack and updating return pointers which point to code objects which have been removed from the main memory.

16. A computer system for execution of an application program in a limited memory space comprising:

a computer having a processor, a main memory, and a secondary memory for storing objects not present in the main memory;

a plurality of code objects, selected ones of which can be moved to and from the main memory during program execution so that execution of the application program is not limited by memory space of the main memory, said selected ones being overlayable code objects;

means for executing overlayable code objects, said means including at least one entry stub vector stored in the main memory for calling an overlayable code object at an entry point address, said means also including a return stub vector stored in the main memory for returning to an overlayable code object from another code object which it has called;

means for storing in the main memory an active call frame chain comprising a call frame for each code object that has been called and execution thereof has not been completed; each frame comprising: a frame pointer register for linking the frame of a called code object to the frame of its calling code object; and a return address pointer register for returning program execution to said calling code object;

means for determining if a code object is resident in the main memory;

means, responsive to said determining means, for entering the return address of a calling code object in said return address pointer register if said object is resident in main memory; and means, responsive to said determining means, for entering the address of the return stub vector of the calling object in said return address pointer register if the object is stored in the secondary memory and not in the main memory.

17. The system of claim 16 further comprising:

means for storing in said return address pointer register the return address of said calling code object if the object has been moved back into main memory.

18. The system of claim 16 wherein:

said at least one entry stub vector and the return stub vector of each overlayable code object are stored together as a cluster in main memory at a main memory location having a single base address.

19. The system of claim 18 wherein:

each said cluster includes information defining the current status and current address of the associated code object.

20. The system of claim 19 further comprising:

means for debugging said application program comprising:

a table of records storing debug information for tracing execution of swappable code objects; and means responsive to said debug information for addressing a code object on the basis of address information stored in said cluster.

21. The system of claim 16 further comprising:

a list of records for ordering the resident code objects from most recently called objects to least recently called objects; and means, responsive to said list, for freeing locations of main memory storing selected ones of said least recently called objects.

22. The system of claim 21 wherein:

said at least one entry stub and the return stub of an overlayable code object which is non-resident store an instruction executable by the processor for trapping all calls or returns to the non-resident object; and the return addresses of frames of the call chain which are to return to the non-resident object rae set to the address of the object's return stub.

23. A computer system for execution of an application program in a limited memory space, said system including a secondary memory for storing at least one code object removed from the limited memory space during program execution, the system comprising:

(a) a computer having a processor and a main memory;

(b) at least one reserved location in the main memory for referencing a code object, said at least one reserved location storing first information for calling the code object and second information for returning to the code object from another code object which it has called;

(c) means for storing as the first information a vector to reference at least one entry point of a code object at a location if the code object is resident in the main memory;

(d) means for storing as the first information an instruction which, when executed by said computer, traps any calls to a code object stored in the secondary memory if the code object is not resident at a location in the main memory;

(e) means for storing as the second information a vector to reference a return point of a code object at a location if the code object is resident in the main memory;

(f) means for storing as the second information an instruction to trap any returns to a code object stored in the secondary memory if the code object is not resident at a location in the main memory;

(g) means for instructing the processor to call a code object by referencing the first information; and (h) means for instructing the processor to return to a code object by referencing the second information.

24. The system of claim 23, further comprising:

(i) means, responsive to the execution of the trap instruction, for moving a selected code object into the main memory and for removing other code objects from the main memory.

25. The system of claim 24, wherein the means for removing includes a queue for aging code objects, whereupon code objects less recently referenced are selected for removal from the main memory.

26. The system of claim 25, wherein the queue includes a status field for each code object for indicating that the object has not been recently referenced.

27. The system of claim 23, further comprising:

a call stack having a plurality of frames, each for storing a return pointer for returning to a code object which has called another object; and means for updating return pointers in the call stack which point to code objects which have been removed from the main memory.

* * * * *